United States Patent
Takeshita et al.

(10) Patent No.: US 6,325,949 B1
(45) Date of Patent: Dec. 4, 2001

(54) LIQUID CRYSTAL COMPOSITION AND LIQUID CRYSTAL DISPLAY ELEMENT

(75) Inventors: Fusayuki Takeshita; Etsuo Nakagawa; Yasuhiro Kubo, all of Chiba (JP)

(73) Assignee: Chisso Corporation, Osaka (JP)

( * ) Notice: Subject to any disclaimer, the term of this patent is extended or adjusted under 35 U.S.C. 154(b) by 0 days.

(21) Appl. No.: 09/551,641

(22) Filed: Apr. 18, 2000

(30) Foreign Application Priority Data

Apr. 19, 1999 (JP) .................................................. 11-110817
Jun. 10, 1999 (JP) .................................................. 11-163709

(51) Int. Cl.$^7$ .......................... C09K 19/30; C09K 19/34; C09K 19/12
(52) U.S. Cl. ................. 252/299.63; 252/299.61; 252/299.66
(58) Field of Search ................. 252/299.01, 299.63, 252/299.66, 299.61; 428/1.1

(56) References Cited

U.S. PATENT DOCUMENTS

| | | | |
|---|---|---|---|
| 5,858,270 | 1/1999 | Matsui et al. | 252/299.01 |
| 5,961,881 | * 10/1999 | Andou et al. | 252/299.63 |
| 6,187,223 | * 2/2001 | Andou et al. | 252/299.63 |

FOREIGN PATENT DOCUMENTS

| | | |
|---|---|---|
| 0786445 | 7/1997 | (EP) . |
| 0786508 | 7/1997 | (EP) . |
| 0844295 | 5/1998 | (EP) . |
| 2-237949 | 9/1990 | (JP) . |
| 8-73857 | 3/1996 | (JP) . |
| 9-31460 | 2/1997 | (JP) . |
| 10-251186 | 9/1998 | (JP) . |

OTHER PUBLICATIONS

Jakeman et al., "Electro–Optic Response Times in Liquid Crystals", Physics Letters, vol. 39A, No. 1, Apr. 10, 1972, pp. 69–70.
Abstract of WO 96/11897, 1996.
Patent Abstracts Of Japan, vol. 1998, No. 14, Dec. 31, 1998 & JP 10 251186 A (Chisso Corporation), Sep. 22, 1998.

* cited by examiner

Primary Examiner—Shean C. Wu
(74) Attorney, Agent, or Firm—Wenderoth, Lind & Ponack, L.L.P.

(57) ABSTRACT

The present invention provides a liquid crystal composition comprising a component A being at least one compound selected from the group of compounds represented by Formulas (1-1) and (1-2) described in the specification and a component B being at least one compound selected from the group of compounds represented by Formulas (2-1) and (2-2) described in the specification.

6 Claims, No Drawings

LIQUID CRYSTAL COMPOSITION AND LIQUID CRYSTAL DISPLAY ELEMENT

BACKGROUND OF THE INVENTION

1. Field of the Invention

The present invention relates to a nematic liquid crystal composition. More specifically, the present invention relates to a liquid crystal composition for an active matrix (AM) mode and a liquid crystal display element (LCD) using this liquid crystal composition.

2. Description of the Related Art

A liquid crystal display element of an active matrix mode (AM-LCD) enables highly fine display, and therefore it attracts attentions as the most likely candidate of a liquid crystal display element and is applied to display faceplates for monitors, note type personal computers, digital still cameras, digital video cameras and the like. Characteristics required to a liquid crystal composition for AM-LCD include the following (1) to (5):

(1) In order to expand the temperature range in which the liquid crystal display element can be used, the liquid crystal composition shows a nematic phase in as broad temperature range as possible (the upper limit temperature of the nematic phase is elevated as much as possible, and the lower limit temperature of the nematic phase is lowered as much as possible).

(2) In order to accelerate the response speed of the liquid crystal display element, the liquid crystal composition is reduced in a viscosity as much as possible.

(3) In order to raise the contrast of the liquid crystal display element, the optical anisotropy value (Δn) of the liquid crystal composition can take a suitable vale according to the cell thickness (d) of the liquid crystal display element.

(4) In order to raise the contrast of the liquid crystal display element, the resistivity value of the liquid crystal composition is elevated, and the voltage-holding ratio of a cell into which the liquid crystal composition is charged is elevated. In particular, the voltage-holding ratio in a high temperature area is elevated. Measurement of the voltage-holding ratio in a high temperature area corresponds to an acceleration test for making sure of the durability of the liquid crystal composition.

(5) In order to miniaturize a battery which is a driving power source for the liquid crystal display element, the liquid crystal composition is reduced in a threshold voltage.

In light of such backgrounds, disclosed in Japanese Patent Application Laid-Open No. 73857/1996 is a liquid crystal composition which has a high voltage-holding ratio and is low in a threshold voltage and which has a suitably large optical anisotropy. Also, disclosed in Japanese Patent Application Laid-Open No. 31460/1997 is a liquid crystal composition which, in particular, has a low threshold voltage, an excellent compatibility at a low temperature and a broad temperature range of a nematic phase while satisfying various characteristics required to a liquid crystal composition for AM-LCD. Further, disclosed in International Publication WO96/11897 are a novel liquid crystal compound which has a large dielectric constant anisotropy and is notably low in a viscosity as a liquid crystal compound for low voltage driving in various modes including an AM mode and a super twist nematic mode (STN mode), and a liquid crystal composition containing the same. Described in Japanese Patent Application Laid-Open No. 251186/1998 is a compound which is similar to the compound of the present invention represented by Formula (1-1) as a compound having a large dielectric anisotropy and a small temperature dependency.

Driving power sources for note type personal computers, digital still cameras, digital video cameras and the like depend on batteries. In order to use these batteries for long time by one charging, a power consumption of LCD has to be reduced. In recent years, these batteries have been miniaturized and come to be elongated in use time by one charging. Accordingly, liquid crystal compositions have come to be desired to be reduced in a threshold voltage while maintaining the characteristics shown in the items (1) to (4) described above.

In order to reduce a threshold voltage of a liquid crystal composition, a liquid crystal compound having a large dielectric constant anisotropy has to be used. If a liquid crystal compound having a large dielectric constant anisotropy is used to prepare a liquid crystal composition, the liquid crystal composition is increased in a viscosity. Accordingly, a liquid crystal display element using a liquid crystal composition having a reduced threshold voltage has been delayed as well in a response speed. As proposed by E. Jakeman et al [Phys. Lett., A, 39 (1972) 69], a response speed is proportional to a square of a cell gap, and therefore a cell gap of a cell constituting a liquid crystal display element can be reduced in order to accelerate the response speed. As shown in the item (3) described above, however, in a first minimum condition of a TN mode, in order to raise the contract, a value shown by a product (Δn·d) of a cell gap of a cell constituting a liquid crystal display element and optical anisotropy of a liquid crystal composition is set to a fixed value of about 0.5, and therefore if the cell gap is reduced, the optical anisotropy of the liquid crystal composition has to be inevitably increased.

The composition disclosed in Japanese Patent Application Laid-Open No. 73857/1996 described above has the defects that as shown in the comparative examples in the present invention, while the threshold voltage is low and the optical anisotropy is suitably large, the nematic phase has a too low upper limit temperature and that the voltage-holding ratio in a high temperature area is low and the defects that while the optical anisotropy is suitably large and the nematic phase has a high upper limit temperature, the threshold voltage is too high and the voltage-holding ratio in a high temperature area is low.

The composition disclosed in Japanese Patent Application Laid-Open No. 31460/1997 has the defects that as shown in the comparative examples in the present invention, the optical anisotropy is low and the threshold voltage is high and that the nematic phase has a low upper limit temperature.

The liquid crystal composition for AM-LCD (the composition which does not contain a compound having a cyano group at a terminal of the compound; a compound having a cyano group has a low voltage-holding ratio and therefore can not be used for a liquid crystal composition for AM-LCD) disclosed in International Publication WO96/11897 has the defects that as shown in the comparative examples in the present invention, the threshold voltage is not sufficiently lowered and the optical anisotropy is small.

Compounds having three phenylene rings and one $—CF_2O—$ bonding group in a molecule are shown in Examples 32 to 42, 44 and 45 described in Japanese Patent Application Laid-Open No. 251186/1998 but have the defect that the dielectric constant anisotropy (Δε) is small, so that the effect of reducing the threshold voltage is small. Further, among the compositions comprising the F base compound having a high holding ratio in the physical property values described in the examples thereof, the compositions having a Δn of 0.130 or more and a threshold voltage of 1.7 V or less can not be achieved.

As described above, various investigations of liquid crystal compositions have been carried out, and required to a liquid crystal composition for AM-LCD are a reduction in a threshold voltage, which is required for reducing a power consumption while maintaining a high voltage-holding ratio in a high temperature area as maintaining the characteristics shown in the items (1) and (2) described above, and an increase in optical anisotropy, which follows requirement to reduce the gap of the cell in order to accelerate the response speed.

SUMMARY OF THE INVENTION

An object of the present invention is to provide a liquid crystal composition having particularly a voltage-holding ratio elevated in a high temperature area, a sufficiently reduced threshold voltage and an increased optical anisotropy while satisfying general characteristics required to AM-LCD.

Intensive investigations repeated by the present inventors in order to solve these problems have resulted in finding that a liquid crystal composition capable of achieving the object of the present invention can be obtained by combining a conventional compound having a —CF$_2$O— bonding group with a specific liquid crystal compound which is different in a substitution number or position of fluoro atom, and thus they have come to complete the present invention.

The liquid crystal composition of the present invention is shown by the following items 1 to 3:

1. A liquid crystal composition comprising a component A being at least one compound selected from the group of compounds represented by Formulas (1-1) and (1-2) and a component B being at least one compound selected from the group of compounds represented by Formulas (2-1) and (2-2):

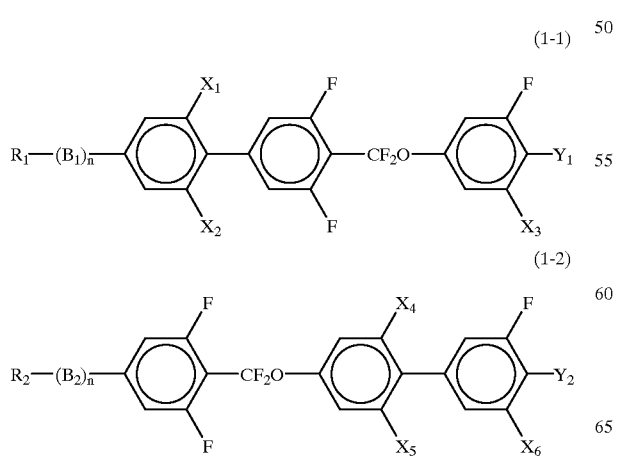

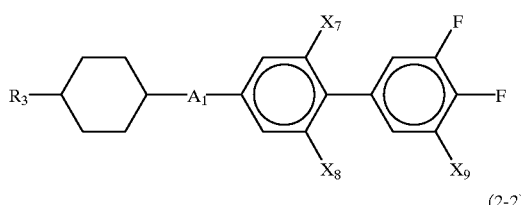

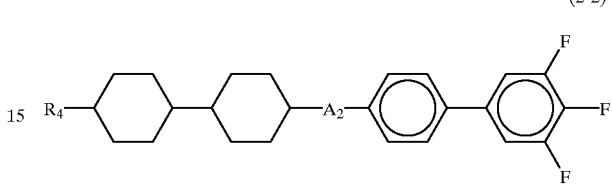

wherein $R_1$, $R_2$, $R_3$ and $R_4$ each represent independently an alkyl or alkoxy group having 1 to 10 carbon atoms, an alkenyl or alkoxymethyl group having 2 to 10 carbon atoms; $A_1$ and $A_2$ each represent independently a single bond or —C$_2$H$_4$—; $X_1$, $X_2$, $X_3$, $X_4$, $X_5$, $X_6$, $X_7$, $X_8$ and $X_9$ each represent independently H or F; $B_1$ and $B_2$ each represent independently cyclohexylene, trans-1,3-dioxane-2,5-diyl, 1,4-phenylene or 1,4-phenylene substituted by 1 to 4 fluorine; $Y_1$ and $Y_2$ each represent independently F, CF$_3$, OCF$_3$, CF$_2$H or Cl; and n is 0 or 1.

2. A liquid crystal composition according to above item 1, comprising the component A of 5 to 95% by weight and the component B of 5 to 95% by weight, respectively, based on the total weight of the liquid crystal composition.

3. A liquid crystal composition according to above item 1, comprising a component A of 5 to 95% by weight being at least one compound selected from the group of compounds represented by Formulas (1-1) and (1-2) mentioned above, a component B of 5 to 95% by weight being at least one compound selected from the group of compounds represented by Formulas (2-1) and (2-2) mentioned above and a component C of 25% or less by weight being at least one compound selected from the group of compounds represented by the following Formula (3), respectively, based on the total weight of the liquid crystal composition:

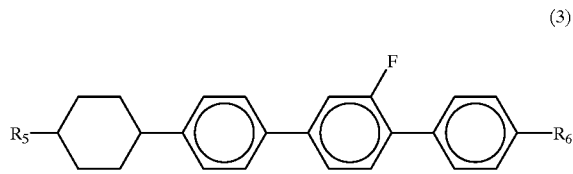

wherein $R_5$, and $R_6$ each represent independently an alkyl group having 1 to 10 carbon atoms.

The liquid crystal display element of the present invention is shown by the following item 4.

4. A liquid crystal display element containing a liquid crystal composition as set forth in any of the above items 1 to 3.

DESCRIPTION OF THE PREFERRED EMBODIMENTS

The preferred embodiments of the compound constituting the liquid crystal composition of the present invention shall be explained.

Compounds represented by the following Formulas (1-1-1) to (1-1-31) are preferred as the compound represented by Formula (1-1) in the component A of the liquid crystal composition of the present invention.
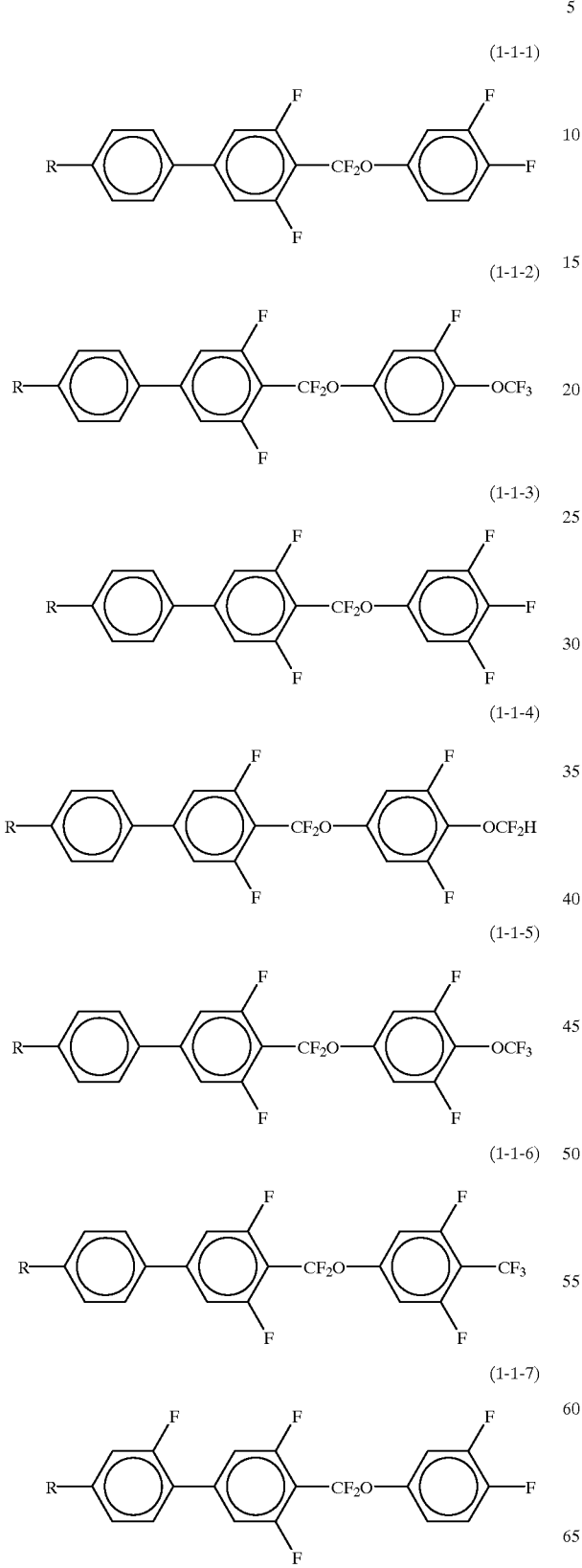
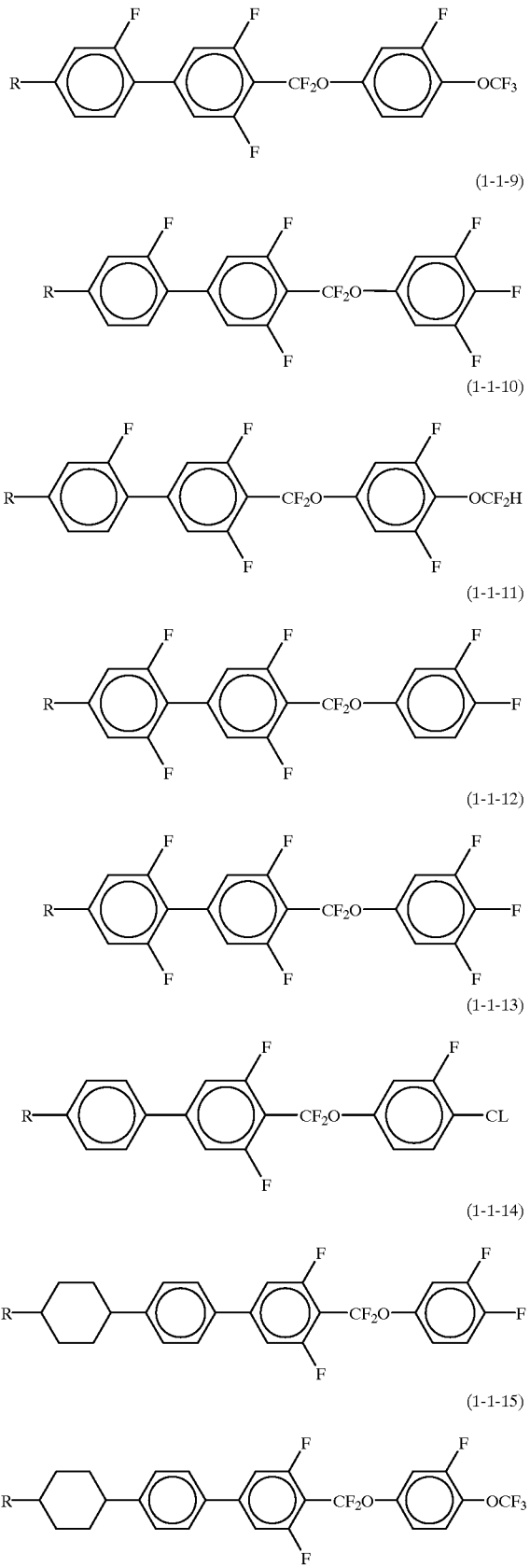

(1-1-16)
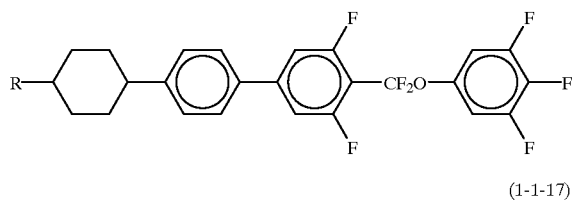
(1-1-17)
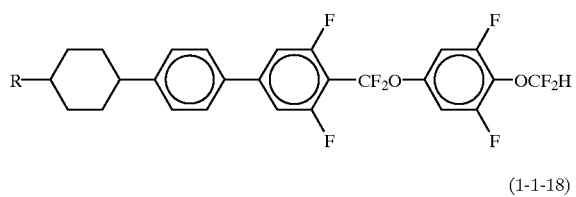
(1-1-18)
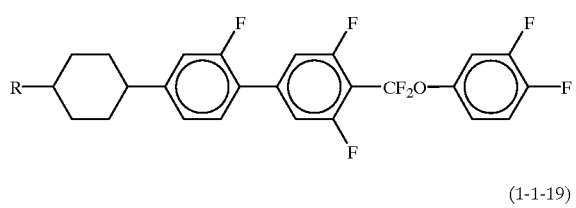
(1-1-19)
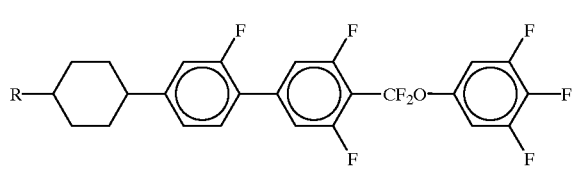
(1-1-20)
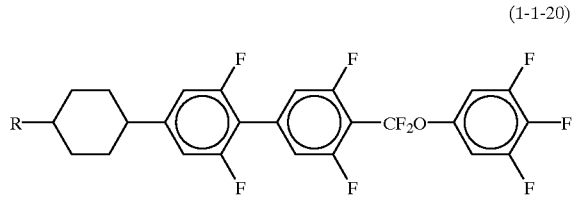
(1-1-21)
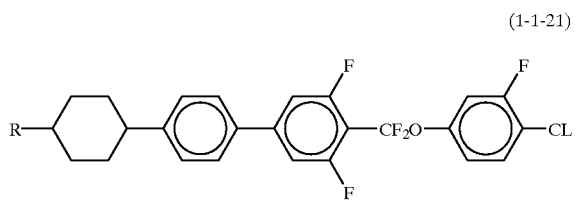
(1-1-22)
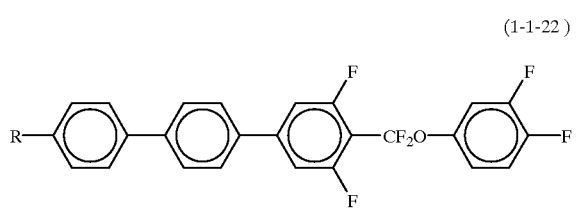
(1-1-23)
(1-1-24)
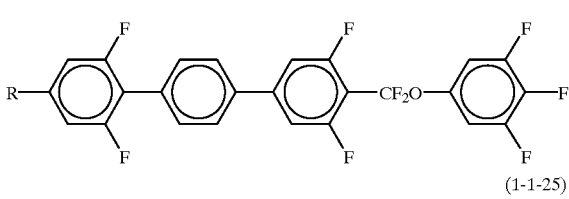
(1-1-25)
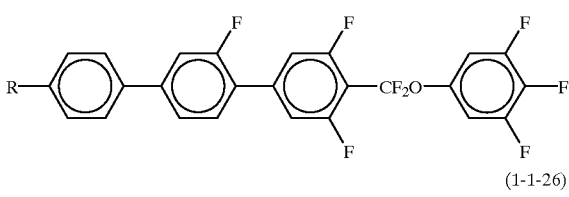
(1-1-26)
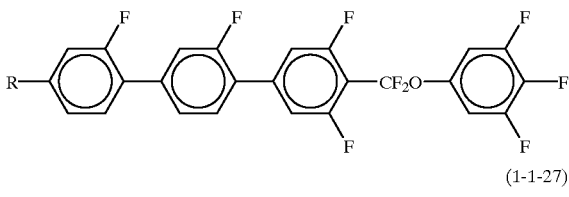
(1-1-27)
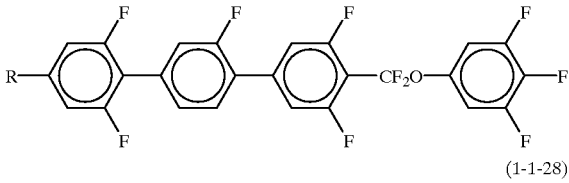
(1-1-28)
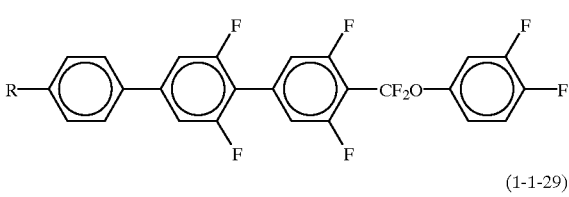
(1-1-29)
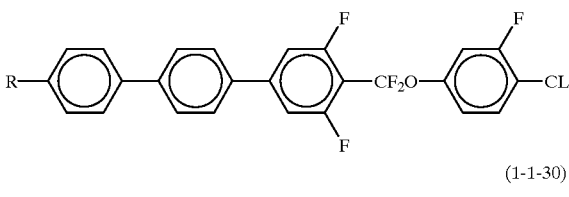
(1-1-30)
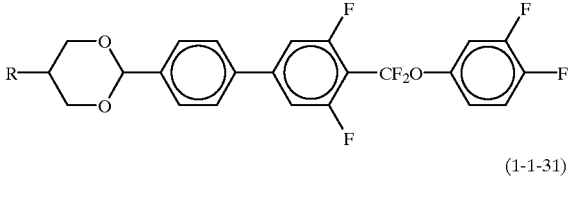
(1-1-31)
In these formulas, R's each represent independently an alkyl or alkoxy group having 1 to 10 carbon atoms, or an alkoxymethyl or alkenyl group having 2 to 10 carbon atoms.

Compounds represented by the following Formulas (1-2-1) to (1-2-21) are preferred as the compound represented by Formula (1-2) in the component A of the liquid crystal composition of the present invention.
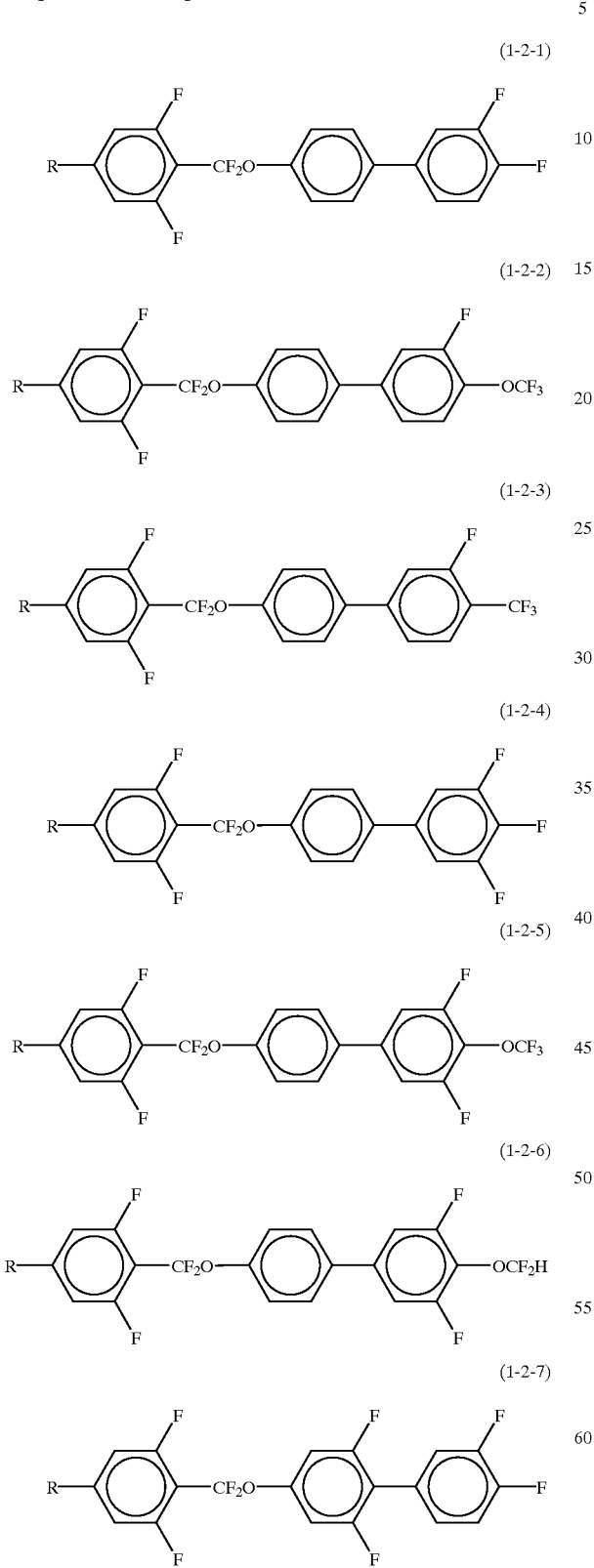
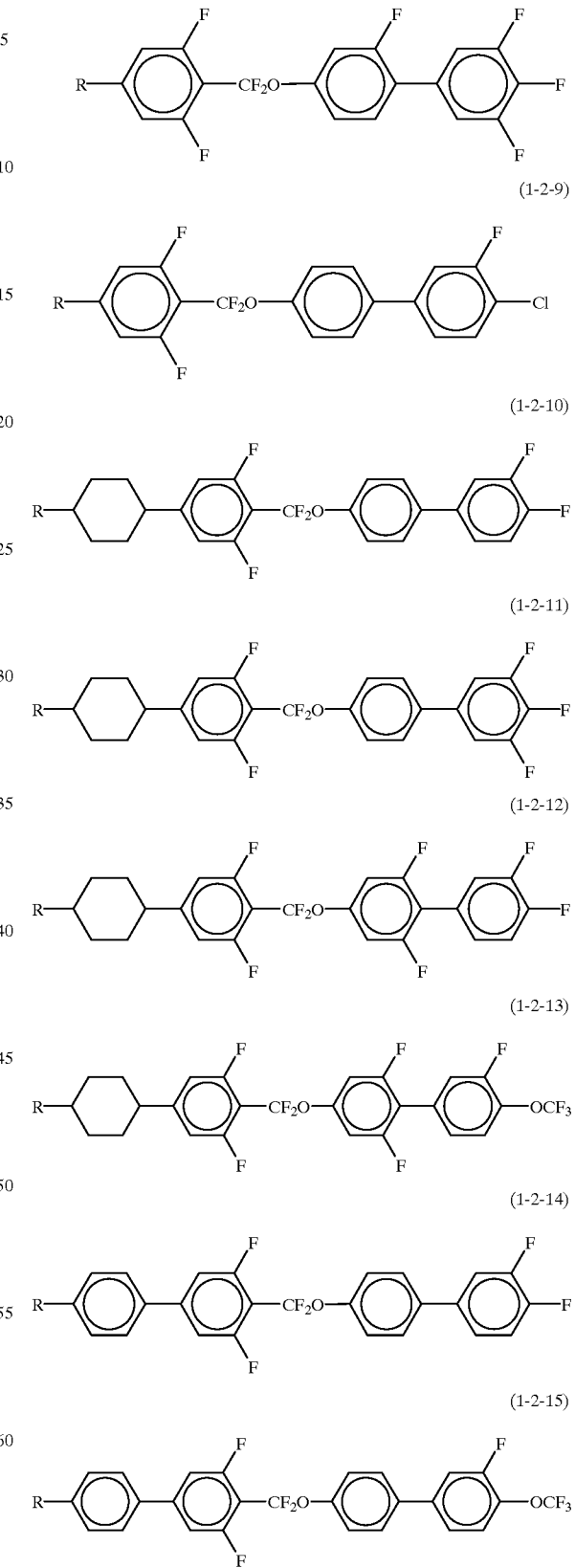

-continued

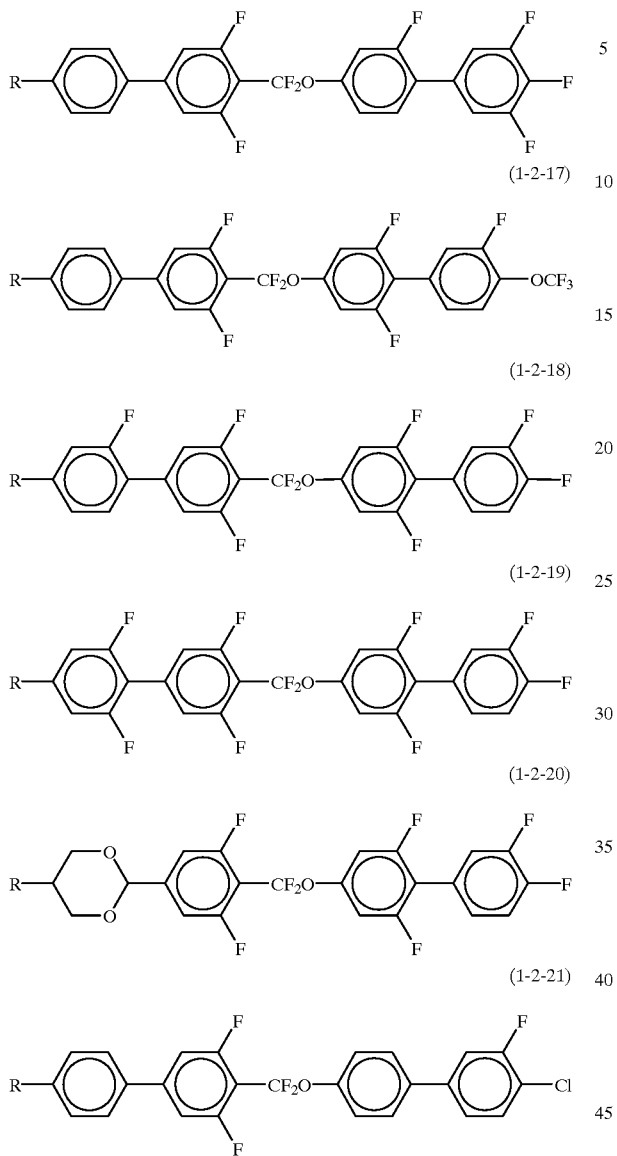

R's in these formulas are synonymous with those described above.

Compounds represented by the following Formulas (2-1-1) to (2-1-7) are preferred as the compound represented by Formula (2-1) in the component B of the liquid crystal composition of the present invention.

-continued

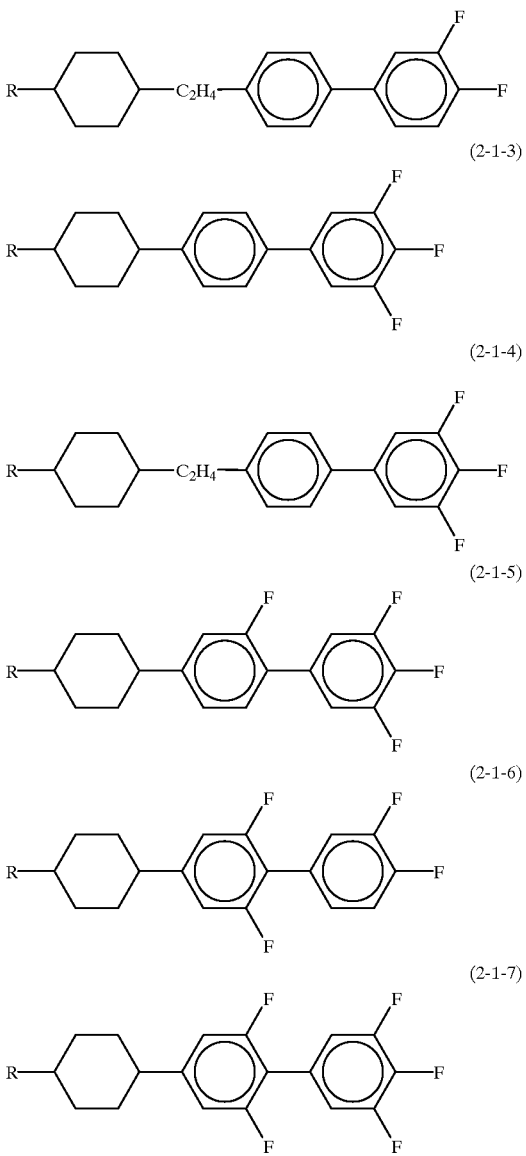

R's in these formulas are synonymous with those described above.

A compound represented by the following Formula (2-2-1) or (2-2-2) is preferred as the compound represented by Formula (2-2) in the component B of the liquid crystal composition of the present invention.

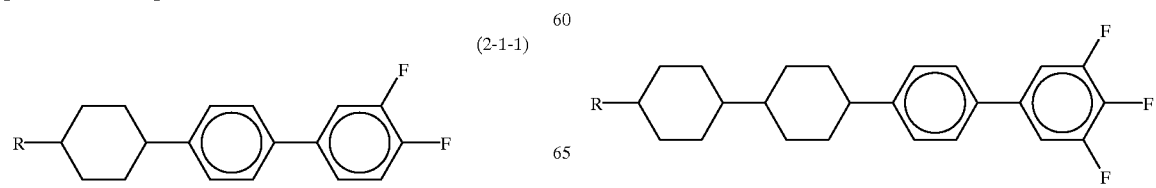

-continued (2-2-2)

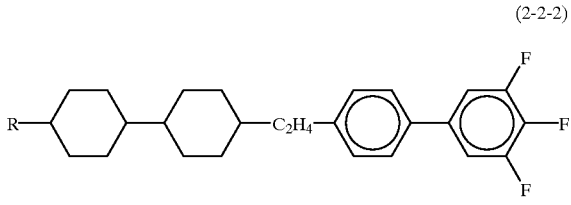

R's in these formulas are synonymous with those described above.

The functions of the compounds constituting the liquid crystal composition of the present invention shall be explained.

The component A in the liquid crystal composition of the present invention has the effects to maintain the viscosity relatively small, increase the optical anisotropy and significantly lower the threshold voltage while maintaining the high voltage-holding ratio of the liquid crystal composition in a high temperature area. This is considered due to that the compound of the component A is substituted with fluorine atoms in the 3-position and 5-position of a phenyl ring at a carbon atom side of a —CF$_2$O— bonding group. Almost all tetracyclic compounds in the component A have a very high T$_{NI}$ (upper limit temperature of liquid crystal) of 80 to 180° C., and therefore the liquid crystal composition having a high T$_{NI}$ can be prepared by using this tetracyclic compound.

The compound of the present invention represented by Formula (2-1) has the effects to reduce the viscosity while maintaining high the voltage-holding ratio of the liquid crystal composition in a high temperature area and control the threshold voltage while maintaining Δn relatively large. The compound represented by Formula (2-1) in the liquid crystal composition of the present invention is a tricyclic compound and does not show such a large dielectric constant anisotropic value as that of the compound of the component A described above but shows a positive value of about 9 to about 18. Further, it has the characteristics that it has a smaller viscosity and a relatively higher resistivity value than those of the compound of the component A described above and that it has almost the same or a little smaller optical anisotropy.

The compound represented by Formula (2-2) in the liquid crystal composition of the present invention has the effects to elevate the upper limit temperature of the liquid crystal composition and reduce the viscosity while maintaining high the voltage-holding ratio of the liquid crystal composition in a high temperature area and control the threshold voltage while maintaining large the optical anisotropy. This compound represented by Formula (2-2) is a tetracyclic compound, and the dielectric constant anisotropic value does not show such a value as that of the compound of the component A but shows a positive value of about 10 to about 14. Further, this compound has the characteristics that it has a T$_{NI}$ of 200° C. or more, which is very higher than that of the compound of the component A, and a smaller viscosity and that it has a high resistivity value and shows a optical anisotropy which is almost the same as or smaller than that of the compound of the component A.

The compound represented by Formula (3) which is the component C in the liquid crystal composition of the present invention has the effects to elevate the upper limit temperature of the nematic phase, control the threshold voltage and fairly increase the optical anisotropy while maintaining high the voltage-holding ratio of the liquid crystal composition in a high temperature area. This compound represented by Formula (3) has the characteristics that it has a dielectric constant anisotropy of almost 0 and a high resistivity value and that it has a very high optical anisotropy of 0.2 or more and a very high upper limit temperature of the nematic phase of 250° C. or higher.

That is, the liquid crystal composition of the present invention has the characteristics that it reduces particularly the threshold voltage very much while showing the relatively large Δn owing to the component A and that it controls the nematic phase range, the optical anisotropy and the threshold voltage owing to the component B.

The preferred contents of the components constituting the liquid crystal composition of the present invention shall be explained.

The component A in the liquid crystal composition of the present invention has preferably a content of 5 to 95% by weight based on the whole weight of the liquid crystal composition, and the component B has preferably a content of 5 to 95% by weight based on the whole weight of the liquid crystal composition.

To explain in further details, the compound represented by Formula (1-1) or (1-2) which is the component A is preferably blended in as much amount as possible with the composition in order to reduce the threshold voltage, but if a large amount thereof is added to the composition, the nematic phase lower limit temperature of the liquid crystal composition is elevated in a certain case. Accordingly, the proportion of the component A occupying in the liquid crystal composition is preferably 95% by weight or less, more preferably 90% by weight or less based on the whole weight of the liquid crystal composition. Further, in order to pretty reduce the threshold voltage while maintaining high the voltage-holding ratio of the liquid crystal composition in a high temperature area, the proportion of the component A to the liquid crystal composition is preferably 5% by weight or more based on the whole weight of the liquid crystal composition.

Further, the tricyclic compounds among the compounds represented by Formula (1-1) or (1-2) in the component A have a relatively low T$_{NI}$ of 50° C. or lower in many cases and therefore are added more preferably in a proportion of 80% by weight or less based on the whole weight of the composition in order to turn the T$_{NI}$ of the liquid crystal composition to a practical temperature.

In the liquid crystal composition of the present invention, if a large amount of the component B is added to the composition, the nematic phase lower limit temperature of the liquid crystal composition is elevated in a certain case. Accordingly, the proportion of the component B of the present invention to the liquid crystal composition is preferably 95% by weight or less, more preferably 85% by weight or less based on the whole weight of the liquid crystal composition. Further, in order to reduce the viscosity or elevate the upper limit temperature of the nematic phase or reduce the lower limit temperature thereof while elevating the voltage-holding ratio of the liquid crystal composition in a high temperature area and maintaining low the threshold voltage, the proportion of the component B to the liquid crystal composition is preferably 5% by weight or more based on the whole weight of the liquid crystal composition.

If the compound represented by Formula (3) which is the component C of the present invention is added to the composition in a large amount, it elevates the nematic phase lower limit temperature of the liquid crystal composition, makes the dielectric constant anisotoropy almost zero and raises the threshold voltage. Accordingly, the proportion of the component C to the liquid crystal composition is preferably 25% by weight or less, more preferably 20% by weight or less based on the whole weight of the liquid crystal composition.

The synthetic processes of the compounds represented by Formula (1-1) or (1-2) in the present invention, for example, the compounds represented by Formulas (1-1-1), (1-1-16) and (1-2-12) are described in Japanese Patent Application Laid-Open No. 251186/1998. The synthetic processes of the compounds represented by Formulas (2-1) or (2-2) in the present invention, for example, the compounds represented by Formulas (2-1-3) and (2-2-2) are described in Japanese Patent Application Laid-Open No. 233626/1990. The synthetic processes of the compounds represented by Formula (3) are described in Japanese Patent Application Laid-Open No. 237949/1990. As described above, the compounds in the respective components constituting the composition of the present invention can be synthesized by prior arts.

Liquid crystal compounds other than the preceding compounds in the components A, B and C can be used for the liquid crystal composition of the present invention in a mixture as long as the object of the present invention is not damaged. The liquid crystal composition according to the present invention is prepared by conventional processes. In general, employed is a process in which various necessary compounds are mixed and dissolved each other at a high temperature. In order to induce a helical structure of the liquid crystal molecules to control the required twist angle, cholesteryl nonanoate (CN) and a chiral dopant such as CM-43L represented by the following formula can be added:

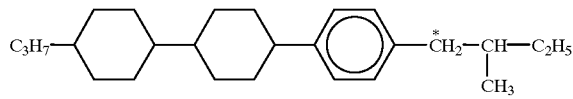

CM-43L

The liquid crystal composition of the present invention can be used as a liquid crystal composition of a guest-host mode by adding dichronic dyes of a merocyanine base, a styryl base, an azo base, an azomethine base, an azoxy base, a quinophthalone base, an anthraquinone base and a tetrazine base. Further, it can be used as a polymer dispersion type liquid crystal display element and liquid crystal compositions of a birefringence-controlling mode and a dynamic scattering mode. It can also be used as a liquid crystal composition of an in.plane.swtching mode.

EXAMPLES

The present invention shall be explained below in detail with reference to examples.

TABLE 1

| 1) Left terminal group R— | Symbol |
|---|---|
| $C_nH_{2n+1}$— | n— |
| $C_nH_{2n+1}O$— | nO— |
| $C_nH_{2n+1}OC_mH_{2m}$— | nOm— |
| $CH_2$=CH— | V— |
| $CH_2$=$CHC_nH_{2n}$— | Vn— |
| $C_nH_{2n+1}CH$=$CHC_mH_{2m}$— | nVm— |
| $C_nH_{2n+1}CH$=$CHC_mH_{2m}CH$=$CHC_kH_{2k}$— | nVmVK— |

TABLE 1-continued

| 2) Bonding group —$Z_1$—, —$Z_n$— | Symbol |
|---|---|
| —$C_2H_4$— | 2 |
| —$C_4H_8$— | 4 |
| —COO— | E |
| —C≡C— | T |
| —CH=CH— | V |
| —$CF_2O$— | CF2O |
| —$OCF_2$— | OCF2 |

| 3) Ring structure —(A1)—, —(An)— | Symbol |
|---|---|
|  | B |
| 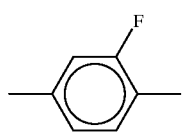 | B(F) |
| 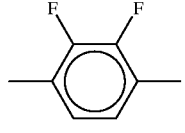 | B(2F,3F) |
| 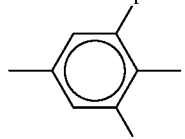 | B(F,F) |
| 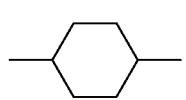 | H |
| 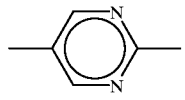 | Py |
| 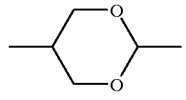 | D |
| 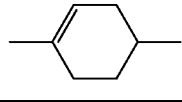 | Ch |

| 4) Right terminal group —X | Symbol |
|---|---|
| —F | —F |
| —Cl | —CL |
| —CN | —C |
| —$CF_3$ | —CF3 |
| —$OCF_3$ | —OCF3 |
| —$OCF_2H$ | —OCF2H |
| —$C_nH_{2n+1}$ | —n |
| —$OC_nH_{2n+1}$ | —On |
| —$COOCH_3$ | —EMe |
| —$C_nH_{2n}CH$=$CH_2$ | —nV |
| —$C_mH_{2m}CH$=$CHC_nH_{2n+1}$ | —mVn |
| —$C_mH_{2m}CH$=$CHC_nH_{2n}F$ | —mVnF |

TABLE 1-continued

| | |
|---|---|
| —CH=CF$_2$ | —VFF |
| —C$_n$H$_{2n}$CH=CF$_2$ | —nVFF |
| —C≡C—CN | —TC |

5) Notation example

Example 1  3-H2B(F,F)B(F)-F

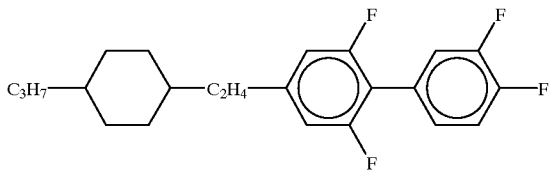

Example 2  3-HB(F)TB-2

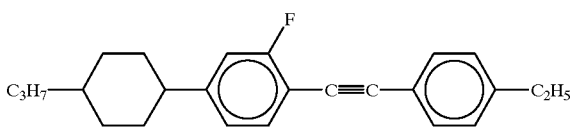

Example 3  1V2-BEB(F,F)-C

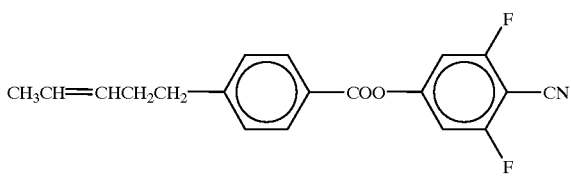

The present invention shall not be restricted to the examples shown below. All composition ratios shown in the comparative examples and the examples were represented by weight %. Compounds used in the comparative examples and the examples were represented by symbols based on definitions shown in Table 1.

In the characteristics of the liquid crystal composition, represented were the upper limit temperature of the nematic liquid crystal phase by $T_{NI}$, the lower limit temperature of the nematic liquid crystal phase by TC, the viscosity by η, the optical anisotropy by Δn, the threshold voltage by Vth, the voltage-holding ratio at 25° C. by VHR (25° C.), the voltage-holding ratio at 100° C. by VHR (100° C.) and the response speed by τ.

$T_{NI}$ was determined by measuring the temperature observed at a heating step using a polarization microscope when the composition was changed from a nematic phase to an isotropic phase liquid.

TC was judged by the liquid crystal phases after the liquid crystal compositions were left standing for 30 days in the respective freezers of 10° C., 0° C., −10° C., −20° C., −30° C. and −40° C. (for example, when one liquid crystal composition took a nematic phase state at −20° C. and was crystallized or turned into a smectic phase state at −30° C., TC of the liquid crystal composition was expressed as <−20° C.)

η was measured at 20° C.

Δn was measured at 25° C. using a light source lamp having a wavelength of 589 nm.

Vth was measured at 25° C. Vth was a value of voltage applied when the transmission factor of light passing through the cell became 90%, wherein the cell having a cell gap of (0.5/Δn) μm and a twist angle of 80° was used, and a square wave having a frequency of 32 Hz was applied in a normally white mode.

The voltage-holding ratio was determined by an area method.

τ was defined by a value of the sum of τ on and τ off, wherein the liquid crystal composition to which cholesteric nonanoate was added so that the pitch of twist was controlled to 80 μm was filled in a cell having a cell gap of (0.5/Δn) μm and a twist angle of 90°; a 5V square wave having a frequency of 1 KHz was applied thereto to determine the response speed (τ on) when the liquid crystal rose up and the response speed (τ off) when the liquid crystal fell down. In this case, the measuring temperature was 25° C.

Compounds used for the compositions shown in the examples (32 to 42, 44 and 45) of Japanese Patent Application Laid-Open No. 251186/1998 are analogous to those of Formula (1-1) in the present invention but are not the same compounds.

A difference between the compounds of the present invention represented by Formula (1-1) and the compounds of Japanese Patent Application Laid-open No. 251186/1998 shall be shown below.

A mother liquid crystal having the following composition and characteristics were prepared:

| | | | |
|---|---|---|---|
| 3-HB-C | 24% | $T_{NI}$ = 71.7° C. |
| 5-HB-C | 36% | Δε = 11.0 |
| 7-HB-C | 25% | Δn = 0.137 |
| 3-HBB-C | 15% | η = 27.0 mPa · s | and the following compounds a, b and c a: 3-BB (F, F) CF2OB (F, F) -F
    <R in Formula (1-1-3) of the present invention: C$_3$H$_7$>
b: 3-B (F, F) CF2OBB (F, F) -F
    <R in Formula (1-2-4) of the present invention: C$_3$H$_7$>
c: 3-B (F) CF2OBB (F, F) -F
    <Japanese Patent Application Laid-Open No. 251186/1998 (compound described in Example 34)> were added to this mother liquid crystal each in 15%: The physical properties thereof were measured, and the physical properties of the compounds a, b and c obtained from the measured values thereof and the physical properties of the mother liquid crystal by extrapolation shall be shown in the following Table 2.

TABLE 2

| | Extrapolated physical property value | | | |
|---|---|---|---|---|
| Compound | $T_{NI}$(° C.) | Δε | Δn | η (mPa · s) |
| a | −5.0 | 29.7 | 0.110 | 40.2 |
| b | −9.8 | 27.6 | 0.104 | 46.6 |
| c | −6.3 | 21.1 | 0.104 | 53.1 |

It is apparent from this Table 2 that the compound a or b of the present invention represented by Formula (1-1) has larger Δn and Δε and lower η than those of the compound c described in Example 34 of Japanese Patent Application Laid-Open No. 251186/1998. The tetracyclic compounds had the same tendency.

Further, detailed explanations shall be given with reference to the following examples and comparative examples.

Example 1

A composition comprising
as the component A:

| | |
|---|---|
| 2-HBB (F, F) CF2OB (F, F) -F | 7% |
| 3-HBB (F, F) CF2OB (F, F) -F | 7% |
| 3-BBB (F, F) CF2OB (F, F) -F | 6% |
| as the component B: | |
| 2-HBB (F) -F | 7.5% |
| 3-HBB (F) -F | 7.5% |
| 5-HBB (F) -F | 15% |
| 3-HBB (F, F) -F | 15% |
| 5-HBB (F, F) -F | 15% |
| 3-H2BB (F, F) -F | 8% |
| 2-HHBB (F, F) -F | 4% |
| 3-HHBB (F, F) -F | 4% |
| 4-HHBB (F, F) -F | 4% | was prepared. The composition described above had characteristics shown below:

| | | |
|---|---|---|
| $T_{NI}$ | = | 105.0° C. |
| TC | < | −20° C. |
| η | = | 49.3 mPa · s |
| Δn | = | 0.151 |
| Vth | = | 1.40 V |
| VHR (25° C.) | = | 98.7% |
| VHR (100° C.) | = | 95.2% |
| τ | = | 27 ms |

This composition had very large Δn, high VHR at a high temperature, small Vth and quick τ as compared with those of the compositions of the comparative examples described later.

Example 2

A composition comprising

| | |
|---|---|
| as the component A: | |
| 2-BB (F, F) CF2OB (F, F) -F | 9% |
| 3-BB (F, F) CF2OB (F, F) -F | 11% |
| 3-HBB (F, F) CF2OB (F) -F | 10% |
| 2-HBB (F, F) CF2OB (F, F) -F | 10% |
| 3-HBB (F, F) CF2OB (F, F) -F | 10% |
| 2-BB (F, F) CF2OBB (F) -F | 8% |
| 3-BB (F, F) CF2OBB (F) -F | 9% |
| 3-BB (F, F) CF2OB (F, F) B (F) -F | 3% |
| as the component B: | |
| 3-HBB (F, F) -F | 15% |
| 5-HBB (F, F) -F | 15% | was prepared. This composition had characteristics shown below:

| | | |
|---|---|---|
| $T_{NI}$ | = | 73.6° C. |
| TC | < | −20° C. |
| Δn | = | 0.152 |
| Vth | = | 1.05 V |
| VHR (25° C.) | = | 98.7% |
| VHR (100° C.) | = | 95.3% |
| τ | = | 29 ms |

This composition had very large Δn, high VHR at a high temperature, small Vth and quick τ as compared with those of the compositions of the comparative examples described later.

Example 3

A composition comprising

| | |
|---|---|
| as the component A: | |
| 2-HBB (F, F) CF2OB (F, F) -F | 9% |
| 3-HBB (F, F) CF2OB (F, F) -F | 9% |
| as the component B: | |
| 2-HBB (F) -F | 7.5% |
| 3-HBB (F) -F | 7.5% |
| 5-HBB (F) -F | 15% |
| 3-HBB (F, F) -F | 15% |
| 5-HBB (F, F) -F | 15% |
| 3-H2BB (F, F) -F | 8% |
| as the component C: | |
| 5-HBB (F) B-2 | 7% |
| 5-HBB (F) B-3 | 7% | was prepared. This composition had characteristics shown below:

| | | |
|---|---|---|
| $T_{NI}$ | = | 114.1° C. |
| TC | < | −20° C. |
| η | = | 47.5 mPa · s |
| Δn | = | 0.158 |
| Vth | = | 1.52 V |
| VHR (25° C.) | = | 98.7% |
| VHR (100° C.) | = | 95.1% |
| τ | = | 28 ms |

This composition had very large Δn, high VHR at a high temperature, small Vth and quick τ as compared with those of the compositions of the comparative examples described later.

Example 4

A composition comprising
as the component A:

| | |
|---|---|
| 2-BB (F, F) CF2OB (F, F) -F | 12% |
| 3-BB (F, F) CF2OB (F, F) -F | 12% |
| as the component B: | |
| 2-HBB (F) -F | 7.5% |
| 3-HBB (F) -F | 7.5% |
| 5-HBB (F) -F | 15% |
| 3-HBB (F, F) -F | 13% |
| 5-HBB (F, F) -F | 13% |
| 3-H2BB (F, F) -F | |
| as the component C: | |
| 5-HBB (F) B-2 | 8% |
| 5-HBB (F) B-3 | 8% | was prepared. This composition had characteristics shown below:

| | | |
|---|---|---|
| $T_{NI}$ | = | 93.1 |
| TC | < | −30° C. |
| η | = | 39.6 mPa · s |
| Δn | = | 0.147 |
| Vth | = | 1.45 V |
| VHR (25° C.) | = | 98.7% |
| VHR (100° C.) | = | 95.1% |
| τ | = | 25 ms |

This composition had very large Δn, high VHR at a high temperature, small Vth and quick τ as compared with those of the compositions of the comparative examples described later.

Example 5

A composition comprising

| as the component A: | |
|---|---|
| 3-B (F, F) CF2OBB (F) -F | 7% |
| 5-B (F, F) CF2OBB (F) -OCF3 | 5% |
| 5-B (F, F) CF2OBB (F) -F | 5% |
| 3-B (F, F) CF2OB (F, F) B (F) -F | 3% |
| 3-HB (F) B (F, F) CF2OB (F, F) -F | 5% |
| 2-HBB (F, F) CF2OB (F) -OCF3 | 5% |
| 3-BB (F, F) CF2OBB (F) -F | 5% |
| 3-BB (F, F) CF2OB (F, F) B (F) -F | 3% |
| as the component B: | |
| 2-HBB (F) -F | 3% |
| 3-HBB (F) -F | 3% |
| 5-HBB (F) -F | 6% |
| 3-HBB (F, F) -F | 15% |
| 5-HBB (F, F) -F | 15% |
| 3-H2BB (F, F) -F | 6% |
| as the component C: | |
| 5-HBB (F) B-2 | 7% |
| 5-HBB (F) B-3 | 7% | was prepared. This composition had characteristics shown below:

| | | |
|---|---|---|
| $T_{NI}$ | = | 99.4° C. |
| TC | < | −20° C. |
| η | = | 50.1 mPa · s |
| Δn | = | 0.162 |
| Vth | = | 1.34 V |
| VHR (25° C.) | = | 98.7% |
| VHR (100° C.) | = | 95.0% |
| τ | = | 29 ms |

This composition had very large Δn, high VHR at a high temperature, small Vth and quick τ as compared with those of the compositions of the comparative examples described later.

Example 6
A composition comprising

| | |
|---|---|
| 3-HBB (F, F) CF2OB (F) -F | 5% |
| 3-HBB (F, F) CF2OB (F, F) -F | 5% |
| 2-BB (F, F) CF2OB (F, F) B (F) -F | 5% |
| 3-BBB (F, F) CF2OB (F, F) -F | 5% |

-continued

| as the component B: | |
|---|---|
| 2-HBB (F) -F | 5% |
| 3-HBB (F) -F | 5% |
| 5-HBB (F) -F | 10% |
| 3-HBB (F, F) -F | 13% |
| 5-HBB (F, F) -F | 13% |
| 7-HBB (F, F) -F | 4% |
| 3-H2B (F, F) -F | 8% |
| 3-HB (F) B (F, F) -F | 5% |
| 3-HB (F, F) B (F) -F | 5% |
| as the component C: | |
| 5-HBB (F) B-2 | 6% |
| 5-HBB (F) B-3 | 6% | was prepared. This composition had characteristics shown below:

| | | |
|---|---|---|
| $T_{NI}$ | = | 104.1° C. |
| TC | < | −20° C. |
| η | = | 47.3 mPa · s |
| Δn | = | 0.161 |
| Vth | = | 1.39 V |
| VHR (25° C.) | = | 98.7% |
| VHR (100° C.) | = | 95.1% |
| τ | = | 26 ms |

This composition had a high VHR at a high temperature, a small Vth, a large Δn and a quick τ.

Example 7

A composition comprising
as the component A:

| | |
|---|---|
| 3-B (F, F) CF2OBB (F) -OCF3 | 5% |
| 2-BB (F, F) CF2OB (F, F) -F | 10% |
| 3-BB (F, F) CF2OB (F, F) -F | 7% |
| 3-BB (F, F) CF2OB (F) -OCF3 | 10% |
| 3-HB (F, F) CF2OB (F, F) B (F) -F | 7% |
| 3-HBB (F, F) CF2OB (F) -F | 12% |
| 3-HBB (F, F) CF2OB (F, F) -F | 10% |
| 5-HBB (F, F) CF2OB (F, F) -F | 10% |
| 3-BB (F, F) CF2OB (F, F) B (F) -F | 7% |
| 3-BB (F, F) CF2OB (F, F) B (F) -OCF3 | 7% |
| 3-BB (F, F) CF2OBB (F) -OCF3 | 7% |
| as the component B: | |
| 2-HBB (F) -F | 4% |
| 3-HBB (F) -F | 4% |
| as the other component: | |
| Cholesteryl nonanoate | 0.27% | was prepared.

Example 8
A composition comprising
as the component A:

| | |
|---|---|
| 2-HBB (F, F) CF2OB (F, F) -F | 10% |
| 3-HBB (F, F) CF2OB (F, F) -F | 10% |
| 2-BBB (F, F) CF2OB (F, F) -F | 5% |
| 3-BBB (F, F) CF2OB (F, F) -F | 5% |

-continued

| as the component B: | |
|---|---|
| 2-HBB (F) -F | 5% |
| 3-HBB (F) -F | 5% |
| 5-HBB (F) -F | 10% |
| 3-HBB (F, F) -F | 7% |
| 5-HBB (F, F) -F | 7% |
| as the component C: | |
| 5-HBB (F) B-2 | 7% |
| 5-HBB (F) B-3 | 7% |
| as the other components: | |
| 3-HB-O2 | 10% |
| 7-HB-CL | 3% |
| 4-HHB-CL | 3% |
| 3-HH-4 | 6% |
| CM-43L | 0.21% | was prepared.

Example 9

A composition comprising
as the component A:

| 3-BB (F, F) CF2OB (F, F) -F | 5% |
|---|---|
| 2-HBB (F, F) CF2OB (F, F) -F | 5% |
| 3-HBB (F, F) CF2OB (F, F) -F | 10% |
| 2-BBB (F, F) CF2OB (F, F) -F | 5% |
| 3-BBB (F, F) CF2OB (F, F) -F | 5% |
| as the component B: | |
| 3-HBB (F) -F | 10% |
| 5-HBB (F) -F | 10% |
| 3-HBB (F, F) -F | 7% |
| 5-HBB (F, F) -F | 7% |
| as the component C: | |
| 5-HBB (F) B-2 | 7% |
| 5-HBB (F) B-3 | 7% |
| as the other components: | |
| 3-HB-O2 | 6% |
| 3-HHB-F | 3% |
| 3-HHB (F) -F | 4% |
| 3-HHB (F, F) -F | 4% |
| 3-HHB-1 | 5% |
| CM-43L | 0.19% | was prepared.

Comparative Example 1

The following composition of Example 41 having the largest Δn among those of the compositions disclosed in Japanese Patent Application Laid-Open No. 251186/1998:

| 3-HB (F, F) CF2OB (F, F) -F | 5% |
|---|---|
| 5-HBBCF2OB (F, F) -F | 5% |
| 2-HHB (F) -F | 2% |
| 3-HHB (F) -F | 2% |
| 5-HHB (F) -F | 2% |
| 2-HBB (F) -F | 6% |
| 3-HBB (F) -F | 6% |
| 2-H2BB (F) -F | 9% |
| 3-H2BB (F) -F | 9% |
| 3-HBB (F, F) -F | 25% |

-continued

| 5-HBB (F, F) -F | 19% |
|---|---|
| 1O1-HBBH-4 | 5% |
| 1O1-HBBH-5 | 5% | was prepared. The composition described above had characteristics shown below:

| $T_{NI}$ | = | 95.1° C. |
|---|---|---|
| $\eta$ | = | 35.5 mPa · s |
| $\Delta n$ | = | 0.132 |
| Vth | = | 1.72 V |
| VHR (25° C.) | = | 98.2% |
| VHR (100° C.) | = | 95.1% |
| $\tau$ | = | 34 ms |

This composition has a high VHR at a high temperature and relatively large Δn, but has the defects that the threshold voltage is high.

Comparative Example 2

The following composition of Example 7 having the largest Δn among those of the compositions disclosed in Japanese Patent Application Laid-Open No. 73857/1996:

| 2-HBEB (F, F) -F | 5% |
|---|---|
| 5-HHEB (F, F) -F | 5% |
| 3-BBEB (F, F) -F | 5% |
| 4-HHB-CL | 10% |
| 3-HBB (F, F) -F | 10% |
| 5-HBB (F, F) -F | 10% |
| 3-H2BB (F, F) -F | 10% |
| 4-H2BB (F, F) -F | 10% |
| 5-H2BB (F, F) -F | 10% |
| 3-HVHB (F) -F | 5% |
| 4-HVHB (F, F) -F | 7% |
| 3-H2BVB-2 | 3% |
| 3-HB (F) VB-4 | 10% | was prepared. The composition described above had characteristics shown below:

| $T_{NI}$ | = | 101.5° C. |
|---|---|---|
| $\eta$ | = | 36.9 mPa · s |
| $\Delta n$ | = | 0.138 |
| Vth | = | 1.73 V |
| VHR (25° C.) | = | 98.5% |
| VHR (100° C.) | = | 91.0% |
| $\tau$ | = | 37 ms |

This composition has a high $T_{NI}$ and a relatively quick response speed but has a high Vth and a small Δn. A compound having an ester group is used for this composition, and therefore it has the defect that the VHR at a high temperature is low.

Comparative Example 3

The following composition of Example 2 having the lowest Vth among those of the compositions disclosed in Japanese Patent Application Laid-Open No. 73857/1996:

| | | |
|---|---|---|
| 5-HHEB (F, F) -F | | 5% |
| 2-HBEB (F, F) -F | | 5% |
| 3-HBEB (F, F) -F | | 5% |
| 5-HBEB (F, F) -F | | 5% |
| 3-BBEB (F, F) -F | | 5% |
| 4-BBEB (F, F) -F | | 5% |
| 5-BBEB (F, F) -F | | 5% |
| 4-HEB (F, F) -F | | 10% |
| 4-HB-CL | | 10% |
| 7-HB (F) -F | | 3% |
| 7-HB (F, F) -F | | 9% |
| 3-HBB (F, F) -F | | 10% |
| 5-HHB (F, F) -F | | 10% |
| 3-H2BB (F, F) -F | | 13% | was prepared. The composition described above had characteristics shown below:

| | | |
|---|---|---|
| $T_{NI}$ | = | 46.1° C. |
| TC | < | −10° C. |
| η | = | 36.3 mPa·s |
| Δn | = | 0.096 |
| Vth | = | 0.91 V |
| VHR (25° C.) | = | 98.3% |
| VHR (100° C.) | = | 92.3% |

This composition has a very small Δn and a low Vth but has a low $T_{NI}$. A compound having an ester group is used as is the case with Comparative Example 2, and therefore this composition has the defect that the VHR at a high temperature is low.

Comparative Example 4

The following composition of Example 12 having the largest Δn among those of the compositions disclosed in Japanese Patent Application Laid-Open No. 31460/1997:

| | | |
|---|---|---|
| 7-HB (F, F) -F | | 9% |
| 3-HHB (F, F) -F | | 10% |
| 3-HH2B (F, F) -F | | 7% |
| 5-HH2B (F, F) -F | | 5% |
| 3-HBB (F, F) -F | | 18% |
| 5-HBB (F, F) -F | | 18% |
| 3-HBEB (F, F) -F | | 5% |
| 5-HBEB (F, F) -F | | 3% |
| 3-HHEB (F, F) -F | | 8% |
| 5-HHEB (F, F) -F | | 5% |
| 2-HHBB (F, F) -F | | 4% |
| 3-HHBB (F, F) -F | | 4% |
| 5-HH2BB (F, F) -F | | 4% | was prepared. The composition described above had characteristics shown below:

| | | |
|---|---|---|
| $T_{NI}$ | = | 78.3° C. |
| TC | < | −30° C. |
| η | = | 30.2 mPa·s |
| Δn | = | 0.103 |
| Vth | = | 1.21 V |
| VHR (25° C.) | = | 98.4% |
| VHR (100° C.) | = | 91.5% |
| τ | = | 41 ms |

This composition has the defects that the Δn is relatively small and the threshold voltage is high and that the VHR at a high temperature is low.

Comparative Example 5

The following composition of Example 36 having the lowest Vth among those of the compositions disclosed in WO96/11897:

| | | |
|---|---|---|
| 3-HBCF2OB (F, F) -F | | 5% |
| 5-HBCF2OB (F, F) -F | | 10% |
| 5-HBCF2OB-CF3 | | 5% |
| 5-HBCF2OB (F) -F | | 5% |
| 3-HBCF2OB-OCF3 | | 5% |
| 7-HB (F, F) -F | | 8% |
| 3-HHB (F, F) -F | | 6% |
| 4-HHB (F, F) -F | | 3% |
| 3-H2HB (F, F) -F | | 10% |
| 4-H2HB (F, F) -F | | 6% |
| 5-H2HB (F, F) -F | | 6% |
| 3-HH2B (F, F) -F | | 10% |
| 5-HH2B (F, F) -F | | 5% |
| 3-HBB (F, F) -F | | 5% |
| 5-HBB (F, F) -F | | 5% |
| 3-HHBB (F, F) -F | | 3% |
| 3-HH2BB (F, F) -F | | 3% | was prepared. The composition described above had characteristics shown below:

| | | |
|---|---|---|
| $T_{NI}$ | = | 61.8° C. |
| TC | < | −20° C. |
| η | = | 23.6 mPa·s |
| Δn | = | 0.083 |
| Vth | = | 1.50 V |
| VHR (25° C.) | = | 98.7% |
| VHR (100° C.) | = | 95.6% |
| τ | = | 43 ms |

This composition has the defects that while the viscosity and the threshold voltage are low and the VHR at a high temperature is high, the Δn is very small, and the $T_{NI}$ is low.

Comparative Example 6

The following composition of Example 37 having the largest Δn among those of the compositions disclosed in WO96/11897:

| | | |
|---|---|---|
| 3-HBCF2OB (F, F) -F | | 5% |
| 3-HBCF2OB-OCF3 | | 5% |
| 3-HB-CL | | 4% |
| 5-HB-CL | | 4% |
| 7-HB-CL | | 5% |
| 2-HHB-CL | | 6% |
| 3-HHB-CL | | 7% |
| 5-HHB-CL | | 6% |
| 2-HBB (F) -F | | 6% |
| 3-HBB (F) -F | | 6% |
| 5-HBB (F) -F | | 12% |
| 3-HBB (F, F) -F | | 13% |
| 5-HBB (F, F) -F | | 13% |
| 3-H2HB (F) -CL | | 3% |
| 3-HB (F) TB-2 | | 3% |
| 3-HB (F) VB-2 | | 2% | was prepared. The composition described above had characteristics shown below:

| | | |
|---|---|---|
| $T_{NI}$ | = | 89.3° C. |
| TC | < | −20° C. |
| η | = | 21.9 mPa·s |
| Δn | = | 0.128 |
| Vth | = | 2.08 V |
| VHR (25° C.) | = | 98.4% |
| VHR (100° C.) | = | 93.5% |
| τ | = | 37 ms |

This composition has a low viscosity and high $T_{NI}$ but has the defects that the Δn is small, the threshold voltage is high and the VHR at a high temperature is a little low.

Example 10

A composition comprising
as the component A:

| | |
|---|---|
| 3-BB (F, F) CF2OB (F, F) -F as the component B: | 30% |
| 3-HBB (F, F) -F | 8% |
| 5-HBB (F, F) -F | 7% |
| 2-HHBB (F, F) -F | 3% |
| 3-HHBB (F, F) -F | 4% |
| 5-HHBB (F, F) -F | 3% |
| as the other components: | |
| 3-HB-O2 | 10% |
| 3-HH-4 | 5% |
| 3-HHB (F, F) -F | 8% |
| 3-HHB-1 | 8% |
| 3-HHB-3 | 9% |
| 3-HHB-F | 5% | was prepared. This composition had characteristics shown below:

| | | |
|---|---|---|
| $T_{NI}$ | = | 78.5° C. |
| TC | < | −20° C. |
| η | = | 30.8 mPa·s |
| Δn | = | 0.112 |
| Vth | = | 1.58 V |
| VHR (25° C.) | = | 98.6% |
| VHR (100° C.) | = | 95.5% |

Example 11

A composition comprising
as the component A:

| | |
|---|---|
| 3-BB (F, F) CF2OB (F, F) -F as the component B: | 30% |
| 2-HHBB (F, F) -F | 3% |
| 3-HHBB (F, F) -F | 4% |
| 5-HHBB (F, F) -F | 3% |
| as the other components: | |
| 3-HB-O2 | 11% |
| 3-HH-4 | 6% |
| 3-HHB (F, F) -F | 10% |
| 4-HHB (F, F) -F | 5% |
| 5-HHB (F, F) -F | 5% |
| 3-H2HB (F, F) -F | 3% |
| 3-HHB-1 | 8% |
| 3-HHB-3 | 7% |
| 3-HHB-F | 5% | was prepared. This composition had characteristics shown below:

| | | |
|---|---|---|
| $T_{NI}$ | = | 80.2° C. |
| TC | < | −30° C. |
| η | = | 30.2 mPa·s |
| Δn | = | 0.102 |
| Vth | = | 1.61 V |
| VHR (25° C.) | = | 98.7% |
| VHR (100° C.) | = | 95.3% |

Example 12

A composition comprising
as the component A:

| | |
|---|---|
| 3-BB (F, F) CF2OB (F, F) -F as the component B: | 30% |
| 2-HHBB (F, F) -F | 3% |
| 3-HHBB (F, F) -F | 3% |
| 5-HHBB (F, F) -F | 3% |
| as the other components: | |
| 3-HB-O2 | 10% |
| 3-HH-4 | 10% |
| 2-HHB-CL | 5% |
| 5-HHB-CL | 6% |
| 3-HHB-1 | 8% |
| 3-HHB-3 | 7% |
| 3-HHB-F | 5% |
| 3-HB (F, F) CF2OB (F, F) -F | 10% | was prepared. This composition had characteristics shown below:

| | | |
|---|---|---|
| $T_{NI}$ | = | 77.9° C. |
| TC | < | −20° C. |
| η | = | 29.8 mPa·s |
| Δn | = | 0.105 |
| Vth | = | 1.65 V |
| VHR (25° C.) | = | 98.5% |
| VHR (100° C.) | = | 95.1% |

Example 13

A composition comprising
as the component A:

| | |
|---|---|
| 3-BB (F, F) CF2OB (F, F) -F as the component B: | 15% |
| 3-HBB (F, F) -F as the other components: | 8% |
| 3-HB-O2 | 8% |
| 3-HH-4 | 7% |

-continued

| | |
|---|---|
| 3-HHB-1 | 8% |
| 3-HHB-3 | 14% |
| 3-HHB-F | 5% |
| 3-HB (F, F) CF2OB (F, F) -F | 15% |
| 2-HHB (F, F) CF2OB (F, F) -F | 5% |
| 3-HHB (F, F) CF2OB (F, F) -F | 5% |
| 4-HHB (F, F) CF2OB (F, F) -F | 5% |
| 5-HHB (F, F) CF2OB (F, F) -F | 5% | was prepared. This composition had characteristics shown below:

| | | |
|---|---|---|
| $T_{NI}$ | = | 81.5° C. |
| TC | < | −20 C. |
| η | = | 27.6 mPa·s |
| Δn | = | 0.119 |
| Vth | = | 1.50 V |
| VHR (25° C.) | = | 98.6% |
| VHR (100° C.) | = | 95.2% |

Example 14

A composition comprising as the component A:

| | |
|---|---|
| 2-BB (F, F) CF2OB (F, F) -F | 10% |
| 3-BB (F, F) CF2OB (F, F) -F | 10% |
| as the component B: | |
| 3-HBB (F, F) -F | 17% |
| 5-HBB (F, F) -F | 17% |
| 2-HHBB (F, F) -F | 3% |
| 3-HHBB (F, F) -F | 4% |
| 4-HHBB (F, F) -F | 3% |
| 5-HHBB (F, F) -F | 3% |
| 3-HH2BB (F, F) -F | 7% |
| as the other components: | |
| 3-HHEB (F, F) -F | 10% |
| 5-GHB (F, F) -F | 16% | was prepared. This composition had characteristics shown below:

| | | |
|---|---|---|
| $T_{NI}$ | = | 76.4° C. |
| TC | < | −30 C. |
| η | = | 36.9 mPa·s |
| Δn | = | 0.115 |
| Vth | = | 1.06 V |
| VHR (25° C.) | = | 98.0% |
| VHR (100° C.) | = | 94.6% |

Example 15

A composition comprising
as the component A:

| | |
|---|---|
| 2-BB (F, F) CF2OB (F, F) -F | 10% |
| 3-BB (F, F) CF2OB (F, F) -F | 16% |
| as the component B: | |
| 3-HBB (F, F) -F | 17% |
| 5-HBB (F, F) -F | 17% |
| 2-HHBB (F, F) -F | 3% |
| 3-HHBB (F, F) -F | 4% |
| 4-HHBB(F, F) -F | 3% |
| 5-HHBB (F, F) -F | 3% |
| S-HH2BB (F, F) -F | 7% |
| as the other components: | |
| 3-HB (F, F) CF2OB (F, F) -F | 15% |
| 5-HB (F, F) CF2OB (F, F) -F | 5% | was prepared. This composition had characteristics shown below:

| | | |
|---|---|---|
| $T_{NI}$ | = | 58.4° C. |
| TC | < | −30 C. |
| η | = | 30.0 mPa·s |
| Δn | = | 0.119 |
| Vth | = | 1.08 V |
| VHR (25° C.) | = | 98.3% |
| VHR (100° C.) | = | 94.9% |

Example 16

A composition comprising as the component A:

| | |
|---|---|
| 2-BB (F, F) CF2OB (F, F) -F | 15% |
| 3-BB (F, F) CF2OB (F, F) -F | 15% |
| as the component B: | |
| 3-HBB (F, F) -F | 15% |
| 5-HBB (F, F) -F | 12% |
| 3-HHB (F, F) -F | 8% |
| 2-HHBB (F, F) -F | 3% |
| 3-HHBB (F, F) -F | 5% |
| 5-HHBB (F, F) -F | 3% |
| as the other components: | |
| 3-HH-4 | 5% |
| 3-HHB-1 | 8% |
| 3-HHB-3 | 11% | was prepared. This composition had characteristics shown below:

| | | |
|---|---|---|
| $T_{NI}$ | = | 83.0° C. |
| TC | < | −30 C. |
| η | = | 26.3 mPa·s |
| Δn | = | 0.113 |
| Vth | = | 1.39 V |
| VHR (25° C.) | = | 98.6% |
| VHR (100° C.) | = | 95.1% |

Example 17

A composition comprising
as the component A:

| | |
|---|---|
| 3-BB (F, F) CF2OB (F, F) -F | 15% |
| as the component B: | |
| 3-HBB (F, F) -F | 15% |
| 5-HBB (F, F) -F | 12% |
| 2-HHBB (F, F) -F | 3% |
| 3-HHBB (F, F) -F | 5% |
| 5-HHBB (F, F) -F | 3% |
| as the other components: | |
| 3-HH-4 | 5% |
| 3-HHB (F, F) -F | 8% |
| 3-HHB-1 | 8% |
| 3-HHB-3 | 11% |
| 3-HB (F, F) CF2OB (F, F) -F | 15% | was prepared. This composition had characteristics shown below:

| | | |
|---|---|---|
| $T_{NI}$ | = | 82.5° C. |
| TC | < | −30° C. |
| $\eta$ | = | 26.1 mPa · s |
| $\Delta n$ | = | 0.107 |
| Vth | = | 1.48 V |
| VHR (25° C.) | = | 98.2% |
| VHR (100° C.) | = | 94.9% |

Example 18

A composition comprising
as the component A:

| | |
|---|---|
| 2-BB (F, F) CF2OB (F, F) -F | 7% |
| 3-BB (F, F) CF2OB (F, F) -F | 15% |
| as the component B: | |
| 3-HBB (F, F) -F | 8% |
| as the other components: | |
| 3-HHB-1 | 8% |
| 3-HHB-3 | 14% |
| 3-HHB-F | 5% |
| 3-HB (F, F) CF2OB (F, F) -F | 15% |
| 5-HB (F, F) CF2OB (F, F) -F | 8% |
| 2-HHB (F, F) CF2OB (F, F) -F | 5% |
| 3-HHB (F, F) CF2OB (F, F) -F | 5% |
| 4-HHB (F, F) CF2OB (F, F) -F | 5% |
| 5-HHB (F, F) CF2OB (F, F) -F | 5% | was prepared. This composition had characteristics shown below:

| | | |
|---|---|---|
| $T_{NI}$ | = | 74.9° C. |
| TC | < | −30° C. |
| $\eta$ | = | 34.3 mPa · s |
| $\Delta n$ | = | 0.125 |
| Vth | = | 0.96 V |
| VHR (25° C.) | = | 98.6% |
| VHR (100° C.) | = | 95.2% |

Example 19

A composition comprising
as the component A:

| | |
|---|---|
| 3-BB (F, F) CF2OB (F, F) -F | 3% |
| as the component B: | |
| 3-HBB (F, F) -F | 20% |
| 5-HBB (F, F) -F | 15% |
| 3-HHBB (F, F) -F | 6% |
| as the other components: | |
| 3-HHB (F, F) -F | 8% |
| 3-HHEB (F, F) -F | 10% |
| 2-HBEB (F, F) -F | 3% |
| 3-HBEB (F, F) -F | 5% |
| 5-HBEB (F, F) -F | 3% |
| 5-HB (F, F) CF2OB (F, F) -F | 3% |
| 5-HB-CL | 11% |
| 3-HH-4 | 8% |
| 3-HHB-1 | 5% | was prepared. This composition had characteristics shown below:

| | | |
|---|---|---|
| $T_{NI}$ | = | 74.2° C. |
| TC | < | −30° C. |
| $\eta$ | = | 22.0 mPa · s |
| $\Delta n$ | = | 0.104 |
| Vth | = | 1.38 V |
| VHR (25° C.) | = | 98.2% |
| VHR (100° C.) | = | 94.9% |

Example 20

A composition comprising
as the component A:

| | |
|---|---|
| 2-BB (F, F) CF2OB (F, F) -F | 5% |
| as the component B: | |
| 3-HBB (F, F) -F | 22% |
| 2-HHBB (F, F) -F | 6% |
| as the other components: | |
| 3-HB (F, F) CF2OB (F, F) -F | 5% |
| 5-HB-CL | 4% |
| 2-HHB (F) -F | 9% |
| 3-HHB (F) -F | 9% |
| 3-HHB (F, F) -F | 8% |
| 4-HHB (F, F) -F | 3% |
| 3-H2HB (F, F) -F | 12% |
| 3-GHB (F, F) -F | 3% |
| 4-GHB (F, F) -F | 8% |
| 5-GHB (F, F) -F | 6% | was prepared. This composition had characteristics shown below:

| | | |
|---|---|---|
| $T_{NI}$ | = | 67.8° C. |
| TC | < | −30° C. |
| $\eta$ | = | 33.2 mPa · s |
| $\Delta n$ | = | 0.091 |

-continued

| Vth | = | 0.89 V |
| VHR (25° C.) | = | 98.0% |
| VHR (100° C.) | = | 94.6% |

Example 21

A composition comprising
as the component A:

| 3-BB (F, F) CF2OB (F, F) -F | 4% |
| as the component B: | |
| 3-HBB (F, F) -F | 21% |
| 3-HHBB (F, F) -F | 4% |
| as the other components: | |
| 3-HB (F, F) CF2OB (F, F) -F | 4% |
| 2-HHB (F) -F | 7% |
| 3-HHB (F) -F | 7% |
| 3-HHB (F, F) -F | 8% |
| 3-H2HB (F, F) -F | 10% |
| 3-HHEB (F, F) -F | 10% |
| 4-HHEB (F, F) -F | 3% |
| 2-HBEB (F, F) -F | 2% |
| 3-HBEB (F, F) -F | 3% |
| 3-HGB (F, F) -F | 3% |
| 4-GHB (F, F) -F | 7% |
| 5-GHB (F, F) -F | 7% | was prepared. This composition had characteristics shown below:

| $T_{NI}$ | = | 70.3° C. |
| TC | < | -30° C. |
| η | = | 38.1 mPa·s |
| Δn | = | 0.091 |
| Vth | = | 0.82 V |
| VHR (25° C.) | = | 98.0% |
| VHR (100° C.) | = | 94.5% |

As shown in the examples, the present invention can provide a liquid crystal composition having particularly a voltage-holding ratio elevated in a high temperature area, a sufficiently reduced threshold voltage and an increased optical anisotropy while satisfying general characteristics required to a liquid crystal display element (AM-LCD) of an active matrix mode.

What is claimed is:

1. A liquid crystal composition comprising a component A being at least one compound selected from the group of compounds represented by Formulas (1-1) and (1-2) and a component B being at least one compound selected from the group of compounds represented by Formulas (2-1) and (2-2):

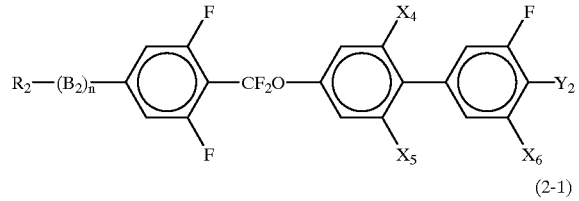

(1-1)

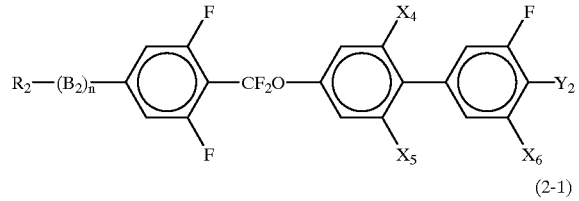

(1-2)

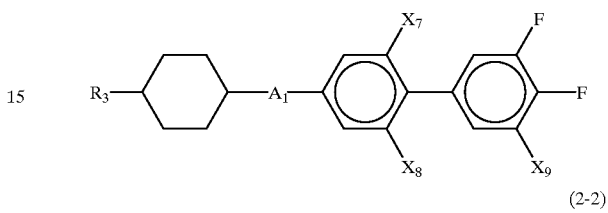

(2-1)

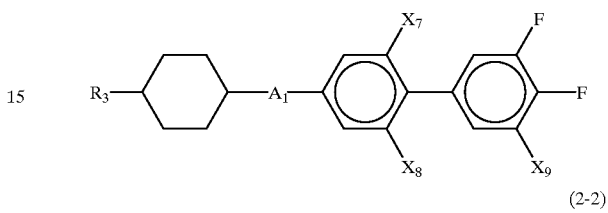

(2-2)

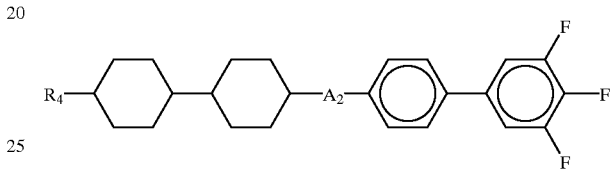

wherein $R_1$, $R_2$, $R_3$ and $R_4$ each represent independently an alkyl or alkoxy group having 1 to 10 carbon atoms, an alkenyl or alkoxymethyl group having 2 to 10 carbon atoms; $A_1$ and $A_2$ each represent independently a single bond or —$C_2H_4$—; $X_1$, $X_2$, $X_3$, $X_4$, $X_5$, $X_6$, $X_7$, $X_8$ and $X_9$ each represent independently H or F; $B_1$ and $B_2$ each represent independently cyclohexylene, trans-1,3-dioxane-2,5-diyl, 1,4-phenylene or 1,4-phenylene substituted by 1 to 4 fluorine atoms; $Y_1$ and $Y_2$ each represent independently F, $OCF_3$, $CF_2H$ or Cl; and n is 0 or 1.

2. A liquid crystal composition according to claim 1, which comprises the component A of 5 to 95% and the component B of 5 to 95%, respectively, based on the total quantity of the liquid crystal composition.

3. A liquid crystal composition comprising a component A of 5 to 95% by weight being at least one compound selected from the group of compounds represented by Formulas (1-1) and (1-2), a component B of 5 to 95% by weight being at least one compound selected from the group of compounds represented by Formulas (2-1) and (2-2) and a component C of 25% or less by weight being at least one compound selected from the group of compounds represented by Formula (3), respectively, based on the total quantity of the liquid crystal composition:

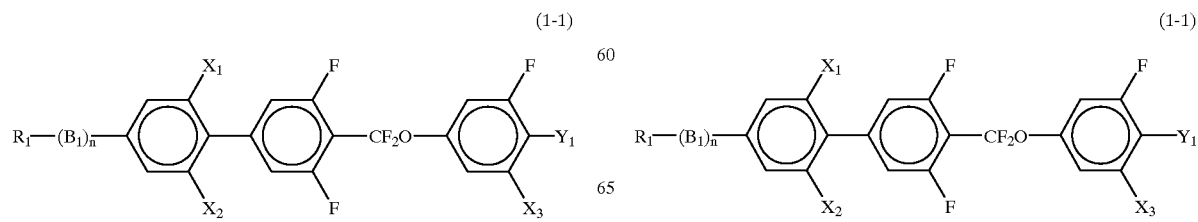

(1-1)

(1-2)

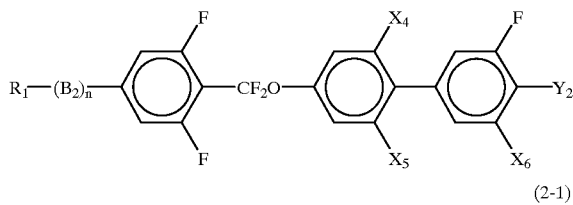

(2-1)

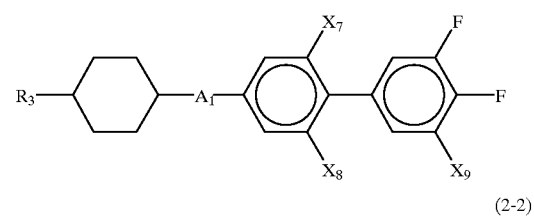

(2-2)

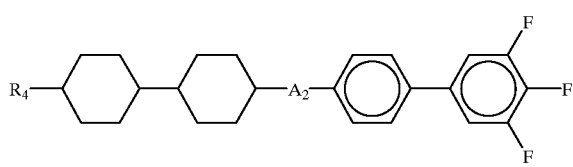

(3)

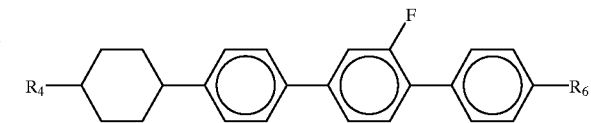

wherein $R_1$, $R_2$, $R_3$ and $R_4$ each represent independently an alkyl or alkoxy group having 1 to 10 carbon atoms, an alkenyl or alkoxymethyl group having 2 to 10 carbon atoms; $A_1$ and $A_2$ each represent independently a single bond or —$C_2H_4$—; $X_1$, $X_2$, $X_3$, $X_4$, $X_5$, $X_6$, $X_7$, $X_8$ and $X_9$ each represent independently H or F; $B_1$ and $B_2$ each represent independently cyclohexylene, trans-1,3-dioxane-2,5-diyl, 1,4-phenylene or 1,4-phenylene substituted by 1 to 4 fluorine atoms; $Y_1$ and $Y_2$ each represent independently F, $CF_3$, $OCF_3$, $CF_2H$ or Cl; and n is 0 or 1; $R_5$ and $R_6$ each represent independently an alkyl group having 1 to 10 carbon atoms.

4. A liquid crystal display element containing a liquid crystal composition as set forth in claim 1.

5. A liquid crystal display element containing a liquid crystal composition as set forth in claim 2.

6. A liquid crystal display element containing a liquid crystal composition as set forth in claim 3.

\* \* \* \* \*